G. R. MENEELY
Improvement in Hanging Bells.
No. 5,030. Reissued Aug 13, 1872.
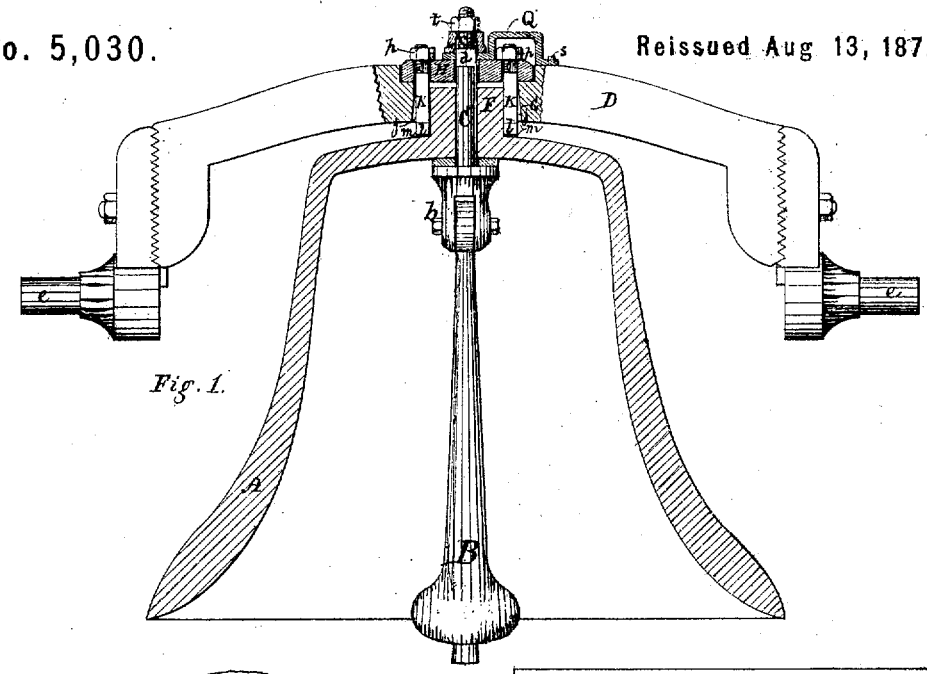
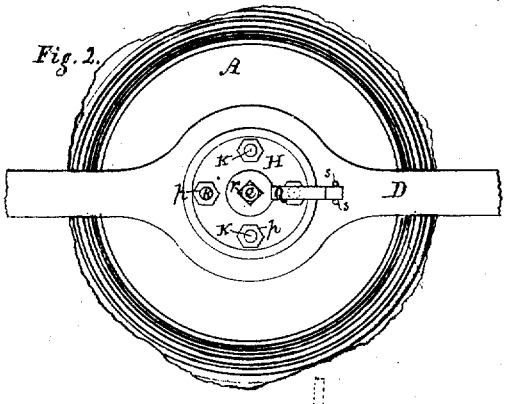
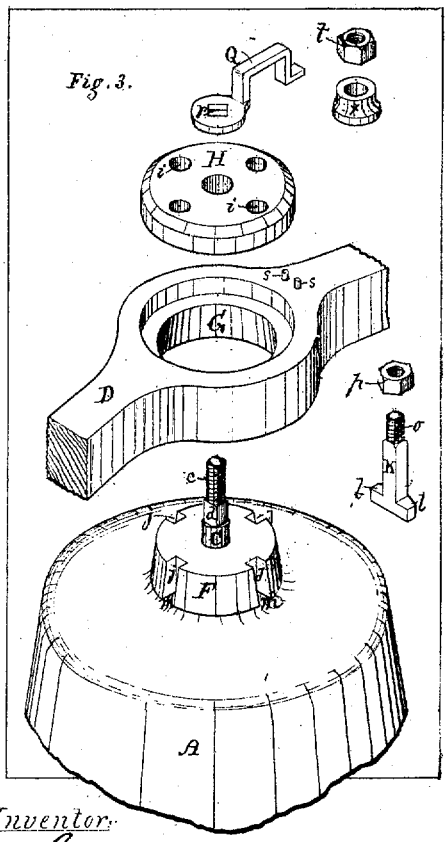
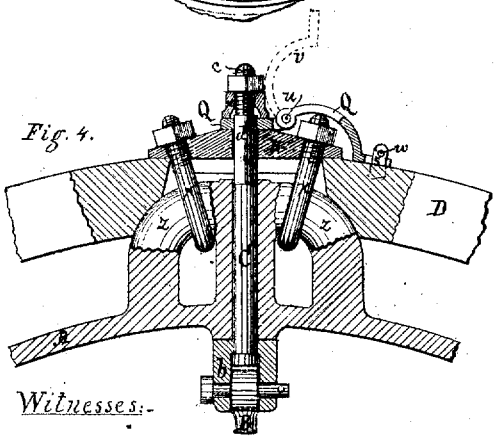
Witnesses:-
T. W. Gitman.
Austin F. Park
Inventor:-
Geo. R. Meneely.
AM. PHOTO-LITHOGRAPHIC CO. N.Y. (OSBORNE'S PROCESS)

UNITED STATES PATENT OFFICE.

GEORGE R. MENEELY, OF WEST TROY, NEW YORK.

IMPROVEMENT IN HANGING BELLS.

Specification forming part of Letters Patent No. 30,338, dated October 9, 1860; reissue No. 5,030, dated August 13, 1872.

SPECIFICATION.

*To all whom it may concern:*

Be it known that I, GEORGE R. MENEELY, of West Troy, in the county of Albany and State of New York, have invented certain Improvements in Devices for Securing Bells and their Attachments to Yokes, of which the following is a specification, reference being had to the accompanying drawing, in which—

Figure 1 is a sectional elevation of a bell and its attachments secured to a yoke according to my invention. Fig. 2 is a top view of a part of the same. Fig. 3 represents portions of the same apparatus disunited. Fig. 4 shows a part of my invention applied to an old-fashioned bell having ears or horns secured to a yoke by the use of clevis-bolts.

Like parts are marked by similar letters in the different figures.

Before this invention bells had been secured in their yokes by means of a round tapering shank on the bell fitted into a corresponding round tapering hole or socket in the yoke and fastened therein by a bolt which had the clapper hung to its head, and which extended up through a hole in the center of the top of the bell and its shank, and through a central hole in a cap-plate over the socket in the yoke, with a screw-thread and nut on the bolt above the cap-plate. By loosening the nut on the bolt the shank of the bell was loosened in the socket in the yoke so that the bell could be turned to present a different part of the circumference of the bell to the blows of the clapper, and, by screwing down the nut on the bolt, the shank of the bell was tightened in the socket in the yoke. At the same time the said central clapper-holding bolt was so fitted in and to the hole through the cap-plate, and the cap-plate was so secured to the yoke, that the bolt could not turn in the cap-plate and the cap-plate could not turn on the yoke when the shank of the bell was loosened and turned in its socket. The combination of the round tapering shank on the bell, with the corresponding socket in the yoke, is an excellent feature, for the wedge-like action and adhesion of those parts enables them to be firmly secured together by simply pressing, and thereby retaining the shank endwise in the socket; and the shank can be loosened in the socket so as to be free to be turned herein by simply releasing the endwise pressure on the shank; but the tightening and fastening of the round tapering shank of the bell in the corresponding socket in the yoke by the central clapper-holding bolt alone was and is deemed quite defective, especially for very large bells, for in such a case that bolt is subjected to very great and irregular strains while the bell is being rung by rocking the yoke, and is liable to get loose and to have flaws, or to be or become brittle or defective in some part; and if only that one bolt should fail or break the bell must fall.

To obviate that defect is the principal object of one part of my invention, which consists in making the cap-plate free to be turned on the yoke over the round tapering socket therein, and having screw-bolts secured in or to the top part or round tapering shank of the bell and extended upward therefrom at points entirely outside of and away from the center or axis of the round tapering shank and within the socket in the yoke and through openings in the cap-plate, so that the cap-plate is thereby secured to and necessarily turned with the bell when the shank of the bell is turned in its socket in the yoke, and so that by tightening these lateral screw-bolts down on the cap-plate the shank on the bell will be thereby fastened in the socket in the yoke independently of any central screw-bolt, or in case a central bolt should become loose, or break, or be dispensed with. Another part of my invention consists in the combination of the round tapering socket in the yoke, movable perforated cap-plate on the yoke over the socket therein, round tapering shank on the bell, screw-bolts uniting the bell and cap-plate at points outside of and away from the center or axis of the cap-plate and shank of the bell, and a clapper-supporting screw-bolt extended up through a hole in the center of the top and shank of the bell and cap-plate, so that the bell is secured in and to the yoke in an exceedingly strong and durable manner by the combined action of the lateral screw-bolts and the central clapper-holding one upon the round tapering shank of the bell in the round tapering socket in the yoke. When all those bolts are loosened the bell can be turned in the yoke, and the cap-plate will be turned on the yoke with the bell; and the cap-plate and bell will be turned around the center bolt, or the center bolt can be turned in the bell and cap-plate in retaining or resetting the clapper to swing in the same plane as the bell and yoke. The aforesaid parts of my invention do not depend upon a particular manner of securing the above-named lateral screw-bolts in or to the bell having the round tapering shank; and the distinguishing feature of another part of my invention is a certain manner of constructing a round tapering shank on a bell, to receive and retain headed or shouldered screw-bolts for securing the shank in a corresponding round tapering socket in a yoke, and to a cap-plate on the yoke over the socket—that is, by forming in the lateral surface of the round tapering shank of the bell two or more recesses which will receive the headed or shouldered portions of the bolts laterally when the shank of the bell is out of the socket of the yoke, and which will retain the said bolts in the recesses when the shank of the bell is inserted in the socket and the bolts are tightened on the cap-plate on the yoke.

By this improvement the bolts can be secured to the bell and cap plate at the greatest practicable distance from the axis of the round tapering shank, so that there may be the least possible leverage strain on the bolts by the bell when the latter is swung to and fro by the yoke, in the usual manner of ringing bells.

Another part of my invention consists in securing the central clapper-supporting bolt to the yoke by means of a key or arm applied to that bolt and to the yoke and secured thereto, so as to prevent that bolt from being turned with the bell when the latter is secured to a cap-plate, which, necessarily, turns on the yoke with the bell, and the clapper-holding bolt extends up through, and may be turned in, a central hole through the top of the bell and cap-plate, and the clapper-holding bolt aids in fastening the bell and cap-plate to the yoke. The object of this part of my invention is to retain the clapper-holding bolt so that the clapper will swing in a plane at right angles to the axis of the yoke when the bell and cap-plate shall be turned in or on the yoke; or in case the clapper-supporting bolt while helping to secure the bolt to the cap-plate should become loose in ringing the bell.

This part of my invention is applicable, as indicated by Fig. 4, to bells having ears or horns *z*, secured by clevis-bolts *x* to a cap-plate, *y*, which turns on the yoke with the bell, as described in my United States patent No. 21,422, as well as to bells having a round tapering shank secured in a like socket in the yoke, as shown in Fig. 1.

In the drawing, A is the bell, and D is the yoke. G is the round tapering socket in the yoke, and F is the corresponding round tapering shank on the bell. H is the cap-plate, fitted to turn on the yoke over the socket therein. K K are bolts, which have screw-threads *o* and nuts *p*, and which are secured to the top part of the bell, and extend up through the socket G in the yoke and through openings *i* in the cap-plate at points entirely outside of and away from the center or axis of the cap-plate and round tapering shank of the bell, so that the cap-plate must turn with the bell whenever the latter shall be turned in the yoke. By screwing the nuts *p* of the bolts K down tight on the cap-plate H the shank of the bell will be secured in the socket in the yoke and to the cap-plate by the lateral screw-bolts *k k* alone. In Fig. 3, *j j* are recesses in the lateral surface of the round tapering shank of the bell, which recesses are enlarged at the lower part *m*, so that the bolts K, when made with heads or shoulders *l*, will fit into and be retained in those recesses, as indicated in Fig. 1. B is the clapper, hung in a clevis, *b*, on the head of the bolt C, which extends up through a hole in the center of the top of the bell and its shank, and through a central hole in the cap-plate H, with a screw, *c*, and nut *t*, on the bolt above the cap-plate, so that when the nut *t* is screwed down tight the central bolt C will assist the lateral bolts K K in securing the round tapering shank F of the bell in the round tapering socket G in the yoke, and so that when the nut *t* is loosened the bolt C can be turned in the bell and cap-plate, when the key Q is detached, to set the clapper to swing at right angles to the line of the journals *e e* of the yoke, and so that when the nuts *p* are also loosened on the bolts K the bell and cap-plate H can then be turned together in the yoke with the bolt C and clapper B, or around the clapper-holding bolt, whenever the latter shall be prevented from turning with the bell and cap-plate. Q is the key, or arm, which has an angular socket, *r*, Fig. 3, and which, when placed on a corresponding part, *d*, of the bolt C, and extending over the cap-plate and engaged with a stop or stop, *s*, on the yoke, as indicated by Figs. 1, 2, or 4, will then prevent the bolt C from being turned with or within the cap-plate and bell, and will thereby maintain the swing of the clapper in a plane perpendicular or nearly so to the axis of the yoke in case the clapper-holding bolt shall become loose in ringing the bell, and when the bell and cap-plate are turned on the yoke to present a different part of the sound-bow of the bell to the blows of the clapper.

In order that the key Q may not interfere with the turning of any of the nuts on the bolts by which the bell is secured in the yoke to the cap-plate, the key may have a rule-joint, as indicated at *u* in Fig. 4, so that a part of the key may be turned away, as represented by dotted lines at *v*, and turned back again and secured to the yoke by a pin, *w*, or other fastening.

Having specifically described the different parts of my invention, I am aware that many of the devices herein described have been used in connection with canons or horns; but the subject-matter of this present invention is confined to bells with a shank and corresponding socket as distinguished from canons or horns; and

What I claim is—

1. The combination of the bell-shank socket in the yoke, rotary cap-plate on the yoke, and side bolts, secured to the cap-plate and shank at points in or near their respective circumferences.

2. The combination of the socket in the yoke, bell-shank, rotary cap-plate, clapper-supporting bolt, and screw-bolts, by which the cap-plate is secured to and turned with the bell in the yoke.

3. A bell having a round tapering shank with vertical slots and recesses in its periphery suitable for the reception and retention of bolts having heads or shoulders thereon, as herein described.

4. The employment of the arm or key Q for the purpose of holding firmly the clapper-bolt while the bell is being revolved, substantially as described.

GEO. R. MENEELY.

Witnesses:

T. W. GETMAN,

AUSTIN F. PARK.